US009196135B2

(12) United States Patent
Shah et al.

(10) Patent No.: US 9,196,135 B2
(45) Date of Patent: Nov. 24, 2015

(54) UNIFORM HAPTIC ACTUATOR RESPONSE WITH A VARIABLE SUPPLY VOLTAGE

(71) Applicant: Immersion Corporation, San Jose, CA (US)

(72) Inventors: Kaniyalal Shah, Fremont, CA (US); Van Hilton Tran, Milpitas, CA (US); Douglas George Billington, Campbell, CA (US)

(73) Assignee: Immersion Corporation, San Jose, CA (US)

( * ) Notice: Subject to any disclaimer, the term of this patent is extended or adjusted under 35 U.S.C. 154(b) by 80 days.

(21) Appl. No.: 14/026,200

(22) Filed: Sep. 13, 2013

(65) Prior Publication Data

US 2015/0002278 A1 Jan. 1, 2015

Related U.S. Application Data

(60) Provisional application No. 61/840,750, filed on Jun. 28, 2013.

(51) Int. Cl.
*H04B 3/36* (2006.01)
*G08B 6/00* (2006.01)

(52) U.S. Cl.
CPC .................................... *G08B 6/00* (2013.01)

(58) Field of Classification Search
CPC .................................................... G08B 6/00
USPC .................... 340/407.1, 407.2, 540, 541, 506
See application file for complete search history.

(56) References Cited

U.S. PATENT DOCUMENTS

| | | | | |
|---|---|---|---|---|
| 6,011,416 | A | 1/2000 | Mizuno et al. | |
| 6,483,501 | B1 | 11/2002 | Yang | |
| 6,489,693 | B1 | 12/2002 | Hetzler | |
| 6,531,998 | B1 * | 3/2003 | Gordon | 345/156 |
| 6,876,104 | B1 | 4/2005 | Guo | |
| 7,298,123 | B2 | 11/2007 | Watanabe et al. | |
| 8,791,799 | B2 * | 7/2014 | Lacroix et al. | 340/407.1 |

* cited by examiner

*Primary Examiner* — Tai T Nguyen
(74) *Attorney, Agent, or Firm* — Miles & Stockbridge P.C.

(57) ABSTRACT

A haptic drive circuit includes a voltage input for receiving input power, a gate that compares a desired current level to an actual current level through the actuator, a switch coupled to the gate that interrupts or provides power from the voltage input to the actuator, and a current probe that detects the actual current level through the actuator with an output signal corresponding to the actual current level coupled to the gate. The gate compares the actual current level to the desired current level and causes the switch to interrupt input power when the actual current level is greater than the desired current level or to provide input power when the actual current level is less than or equal to the desired current level. The actual current through the circuit is a haptic signal causing a haptic actuator to generate a haptic effect.

20 Claims, 6 Drawing Sheets

UNIFORM HAPTIC ACTUATOR RESPONSE WITH A VARIABLE SUPPLY VOLTAGE

CROSS REFERENCE TO RELATED APPLICATIONS

This application claims priority of Provisional Patent Application Ser. No. 61/840,750, filed on Jun. 28, 2013, the contents of which is hereby incorporated by reference.

FIELD

One embodiment of the present invention is directed to an actuator. More particularly, one embodiment of the present invention is directed to a drive circuit for an actuator used to create vibrations on a haptically-enabled device.

BACKGROUND INFORMATION

Electronic device manufacturers strive to produce a rich interface for users. Conventional devices use visual and auditory cues to provide feedback to a user. In some interface devices, kinesthetic feedback (such as active and resistive force feedback) and/or tactile feedback (such as vibration, texture, and heat) is also provided to the user, more generally known collectively as "haptic feedback" or "haptic effects." Haptic feedback can provide cues that enhance and simplify the user interface. Specifically, vibration effects, or vibrotactile haptic effects, may be useful in providing cues to users of electronic devices to alert the user to specific events, or provide realistic feedback to create greater sensory immersion within a simulated or virtual environment.

Haptic feedback has also been increasingly incorporated in portable and mobile electronic devices, such as cellular telephones, smartphones, portable gaming devices, vehicle based devices and interfaces, and a variety of other portable and mobile electronic devices. For example, some portable gaming applications are capable of vibrating in a manner similar to control devices (e.g., joysticks, etc.) used with larger-scale gaming systems that are configured to provide haptic feedback. Further, devices such as those connected to a vehicular power supply may provide haptic feedback over a range of voltage inputs.

In order to generate vibration effects, many devices utilize some type of actuator or haptic output device. Known actuators used for this purpose include an electromagnetic actuator such as an solenoid actuator, an Eccentric Rotating Mass ("ERM") actuator in which an eccentric mass is moved by a motor, a Linear Resonant Actuator vibration motor ("LRA"), or a piezo transducer. Typically, the power source input voltage for the haptic actuator controls the haptic actuator at a certain current draw. A combination of current and voltage vary the haptic response. A haptic controller regulates the current provided to the haptic actuator to provide a varying haptic experience based on the desired current level.

SUMMARY

One embodiment is a haptic drive circuit with a voltage input for receiving input power, a gate that compares a desired current level to an actual current level through the actuator, a switch coupled to the gate that interrupts or provides power from the voltage input to the actuator, and a current probe that detects the actual current level through the actuator with an output signal corresponding to the actual current level coupled to the gate. The gate compares the actual current level to the desired current level and causes the switch to interrupt input power when the actual current level is greater than the desired current level or to provide input power when the actual current level is less than or equal to the desired current level. The actual current through the circuit is a haptic signal causing a haptic actuator to generate a haptic effect.

DETAILED DESCRIPTION

One embodiment is an actuator drive circuit that receives an input supply voltage and provides a uniform haptic response over a range of varying input supply voltages to an actuator. A voltage input block provides power to a haptic actuator. A compare and control gate compares a desired current level with an actual current level and controls a switch to interrupt power when the actual current is greater than the desired current level and provides power when the actual current is less than the desired current level, thereby resulting over time in a near uniform response in the haptic actuator load and an actual current that approximates the desired current level.

Figure 1:
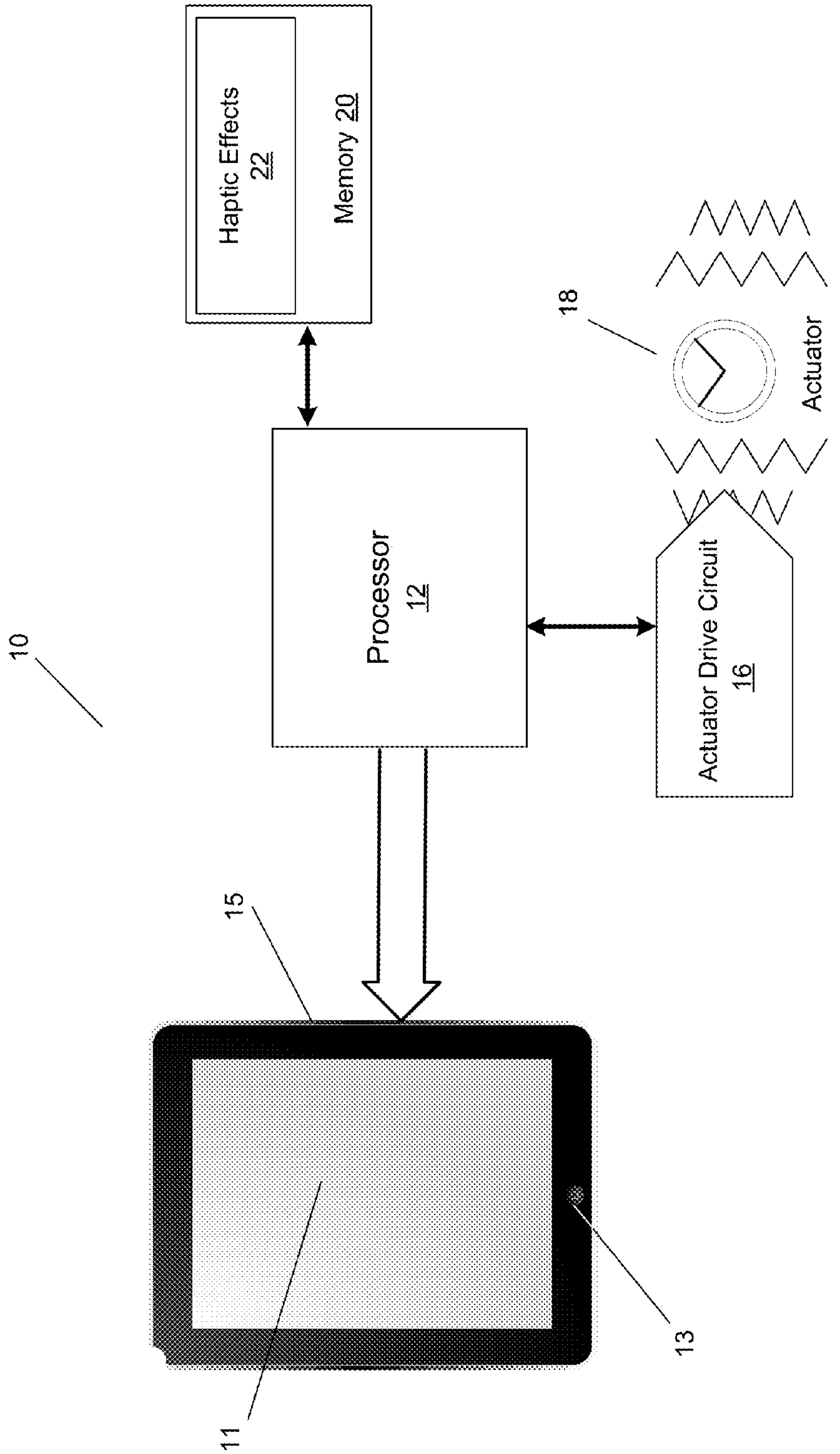
FIG. 1 is a diagram of a haptically-enabled system in accordance with one embodiment of the present invention.

FIG. 1 is a block diagram of a haptically-enabled system 10 in accordance with one embodiment of the present invention. System 10 includes a touch sensitive surface 11 or other type of user interface mounted within a housing 15, and may include mechanical keys/buttons 13. Internal to system 10 is a haptic feedback system that generates vibrations on system 10. In one embodiment, the vibrations are generated on touch surface 11. In one embodiment, system 10 is integrated into a vehicle (e.g., a dashboard) and is powered by the vehicle's 12 volt battery.

The haptic feedback system includes a processor or controller 12. Coupled to processor 12 is a memory 20 and an actuator drive circuit 16, which is coupled to an actuator 18. Actuator 18 can be any type of Direct Current ("DC") motor, and in one embodiment is an Eccentric Rotating Mass ("ERM") actuator and in another embodiment is a solenoid actuator. Processor 12 may be any type of general purpose processor, or could be a processor specifically designed to provide haptic effects, such as an application-specific integrated circuit ("ASIC"). Processor 12 may be the same processor that operates the entire system 10, or may be a separate processor. Processor 12 can decide what haptic effects are to be played and the order in which the effects are played based on high level parameters. In general, the high level parameters that define a particular haptic effect include magnitude, frequency, and duration. Low level parameters such as streaming motor commands could also be used to determine a particular haptic effect. A haptic effect may be considered "dynamic" if it includes some variation of these parameters when the haptic effect is generated or a variation of these parameters based on a user's interaction.

Processor 12 outputs the control signals to actuator drive circuit 16, which includes electronic components and circuitry used to supply actuator 18 with the required electrical current and voltage (i.e., "motor signals") to cause the desired haptic effects. Actuator drive circuit 16 may include a current regulation circuit as described herein to provide a nearly uniform current corresponding to a desired current over a varying range of input voltages. System 10 may include more than one actuator 18, and each actuator may include a separate drive circuit 16, all coupled to a common processor 12. Memory device 20 can be any type of storage device or computer-readable medium, such as random access memory ("RAM") or read-only memory ("ROM"). Memory 20 stores instructions executed by processor 12. Among the instructions, memory 20 includes a haptic effects module 22 which are instructions that, when executed by processor 12, generate drive signals for actuator 18 that provide haptic effects, as disclosed in more detail below. Memory 20 may also be located internal to processor 12, or any combination of internal and external memory.

Touch surface 11 recognizes touches, and may also recognize the position and magnitude of touches on the surface. The data corresponding to the touches is sent to processor 12, or another processor within system 10, and processor 12 interprets the touches and in response generates haptic effect signals. Touch surface 11 may sense touches using any sensing technology, including capacitive sensing, resistive sensing, surface acoustic wave sensing, pressure sensing, optical sensing, etc. Touch surface 11 may sense multi-touch contacts and may be capable of distinguishing multiple touches that occur at the same time. Touch surface 11 may be a touchscreen that generates and displays images for the user to interact with, such as keys, dials, etc., or may be a touchpad with minimal or no images.

System 10 may be a handheld device, such a cellular telephone, personal digital assistant ("PDA"), smartphone, computer tablet, gaming console, vehicle based interface, etc., or may be any other type of device that includes a haptic effect system that includes one or more actuators. The user interface may be a touch sensitive surface, or can be any other type of user interface such as a mouse, touchpad, mini-joystick, scroll wheel, trackball, game pads or game controllers, etc. In embodiments with more than one actuator, each actuator may have a different rotational capability in order to create a wide range of haptic effects on the device.

When the supply power for actuator 18 is not steady, such as in a vehicle, a different haptic effect may be experienced for a user at different input voltages where the targeted effect was uniform. For example, in a haptic device where the actuator is powered by a 12 volt car battery, if processor 12 sends a signal to provide a haptic effect with an intensity x, without power regulation, actuator drive circuit 16 may supply a haptic effect with intensity x−1 when the supply power voltage dips to 10 volts, x when the supply power voltage is 12 volts, and x+1 when the supply power voltage surges to 14 volts. A car battery's output voltage, nominally rated at 12 volts, can validly range from between 8 to 16 volts depending on conditions like power draw and whether the battery is in a state of charge or discharge. Such a wide variation in supply voltage without power regulation would cause a different haptic experience for a user over the voltage range. Actuator drive circuit 16 presents a lower cost solution compared to other alternatives for power regulation. One known alternative may be to use a regulated power supply, but especially for high current requirements, regulated power supplies would be inefficient and expensive. Another known alternative may be to use software to vary the haptic control signals to the actuator drive circuit by either storing additional haptic effects in memory 22 or by scaling the haptic effects. However, storing additional haptic effects in memory 22 may increase the cost of the memory, and scaling the haptic effects may increase the cost of processor 12. The actuator drive circuit 16 in accordance with some embodiments described herein presents another alternative that is less costly than these other options.

Figure 2:
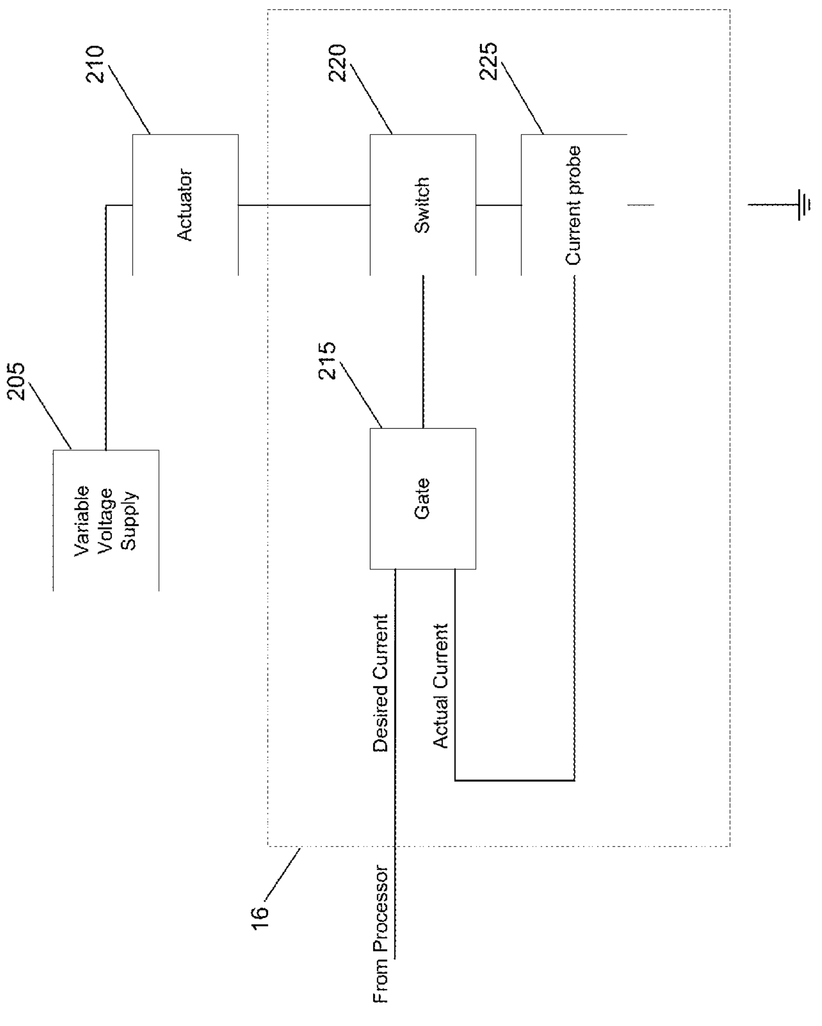
FIG. 2 is a block diagram of logic used in an actuator drive circuit in accordance with an embodiment of the present invention.

FIG. 2 is a block diagram of the logic used in actuator drive circuit 16 in accordance with an embodiment of the present invention. Although shown as a diagram of several blocks, the functionality of drive circuit 16 may be implemented by combining blocks as desired or adding additional blocks. Drive circuit 16 may be implemented using discrete circuit components or using integrated circuits ("ICs").

A variable voltage supply 205 can be a car battery, which outputs typically around 12 volts when discharging or around 14 volts when coupled to a charger such as an alternator. Supply 205 may be provided by any suitable source and may include a direct current ("DC") or alternating current ("AC") voltage source. If variable supply 205 is an AC voltage source, a rectifier may be used to convert the power to a DC voltage source. Variable supply 205 is coupled to an actuator 210.

Actuator 210 may be any suitable actuator used to provide a haptic experience, including an actuator requiring a large supply current. One of ordinary skill in the art will understand that actuator 210 may be any load requiring a near uniform current response over a varying voltage input range. Actuator 210 may have inductive and capacitate properties as well as resistive properties, thus variations in results may be expected over different types of actuators and other loads based on the variances in the electrical characteristics of different load devices.

Power to actuator 210 is controlled by a gate 215. Gate 215 may be implemented by a comparator component. Gate 215 may be a mixed signal circuit block with analog and digital parts. Gate 215 is decision making logic that compares the actual current with the desired current. In some embodiments, the desired current may be converted to an equivalent desired voltage for comparison. Likewise, in some embodiments, the actual current may be converted to an equivalent actual voltage for comparison. In some embodiments, the desired current is provided by processor 12 in the form of a Pulse Width Modulated ("PWM") Digital pulse interruption signal. Gate 215 controls a switch 220 based on a comparison between a desired current level and the actual current level. When the actual current level is greater than the desired current level, gate 215 will control switch 220 to interrupt power provided to actuator 210. When the actual current level is less than the desired current level, gate 215 will control switch 220 to provide power to actuator 210. Thus, through the constant on/off switching of switch 220, the actual current provided to actuator 210 will approximate the desired current for a variable supply voltage range.

Switch 220 may be opened or closed to interrupt or provide power, respectively, from variable supply 205 through actuator 210 to a ground source. Switch 220 may be a high speed/high current electronic switch like a metal oxide semiconductor field effect transistor ("MOSFET"), other field effect transistor, or any transistor that can be turned ON or OFF (closed or opened) by gate 215. When turned ON, switch 220 will allow the power source to be connected to actuator 210 that will provide drive current. When turned OFF, switch 220 will disconnect the power source, stopping source current through actuator 210.

A current probe 225 senses and provides the actual current flow going to actuator 210 to gate 215 for use in its comparison between the actual current and a desired current. Probe 225 may be implemented by a current sense amplifier component. Probe 225 may alternatively provide a voltage representation of the actual current. One skilled in the art will understand that actuator 210, switch 220, and probe 225 may be located interchangeably between variable supply 205 and the ground source for the voltage supply.

Although circuit 16 may be described or illustrated using discrete components, one skilled in the art will understand that some components may be combined into one or more components. In particular, a circuit may integrate all circuit functions into one integrated circuit. One skilled in the art will also understand that some components may be substituted for others to achieve the same or similar effect. In particular, the described comparison and gating functions may be incorporated into a microcontroller. Some components may be substituted by other hardware to achieve the same or similar functionality (e.g., through the use of an application specific integrated circuit ("ASIC"), a programmable gate array ("PGA"), a field programmable gate array ("FPGA"), etc.), or a combination of hardware and software.

Circuit 16 of FIG. 1 may be used in any application where a varying voltage would result in a varying current response across a load, where a more uniform current response is desired to approximate a desired current level for generating haptic effects. Circuit 16 will turn on and off a switch to interrupt the voltage source to provide a current response across a load to approximate the desired current level. For valid varying input voltages, the resulting current response across the load will be similar and may oscillate around the desired current level within an acceptable level of variation. See FIG. 3 for example.

One skilled in the art will understand that switching speed and smoothing capacitors may be selected without undue experimentation to provide an actual current response that more or less closely matches the desired current level. For example, faster switching will generally result in an actual current that more closely resembles the desired current level.

Figure 3:
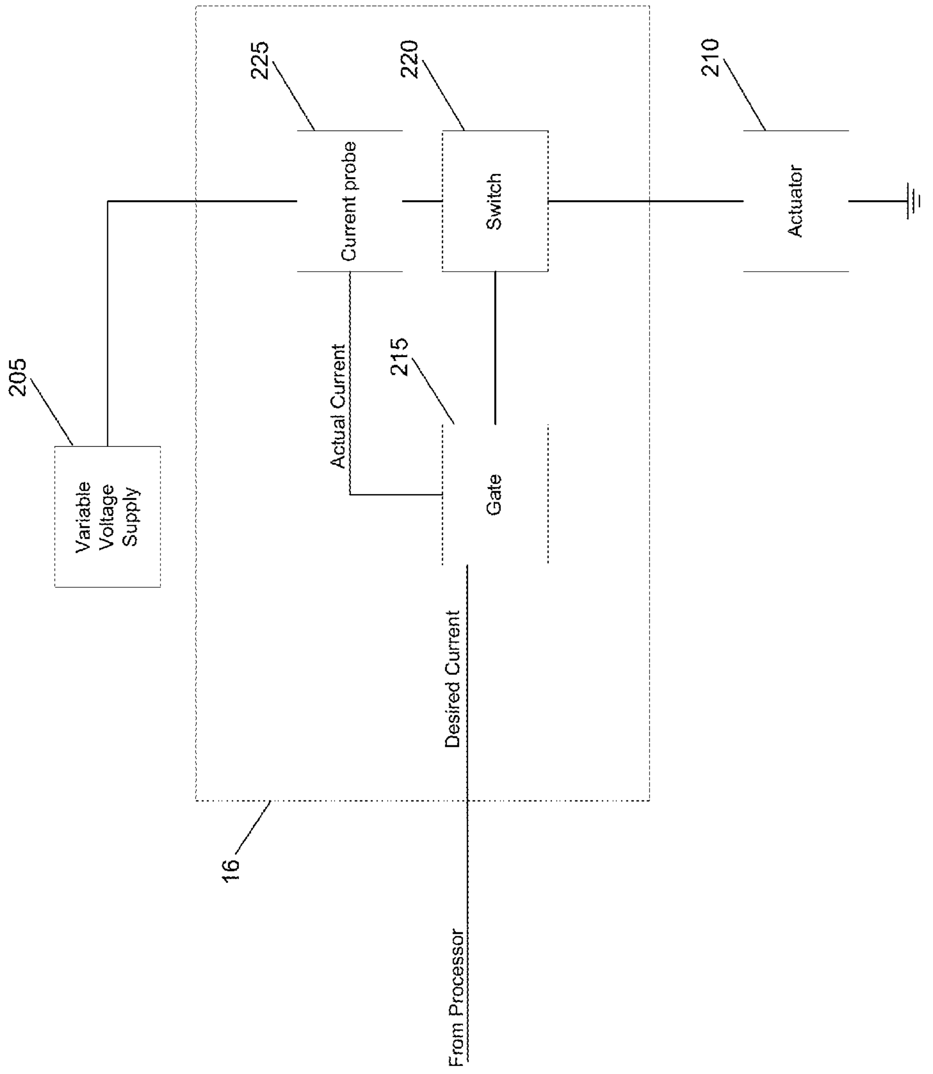
FIG. 3 is a block diagram of logic used in an actuator drive circuit in accordance with an embodiment of the present invention.

FIG. 3 is a block diagram of the logic used in actuator drive circuit 16 in accordance with an embodiment of the present invention. The diagram of FIG. 3 illustrates an alternative implementation of the logic used in an actuator drive circuit. The alternative arrangement of probe 225, switch 220 and actuator 210 illustrates that these components may be arranged interchangeably between variable voltage source 205 and ground.

Figure 4:
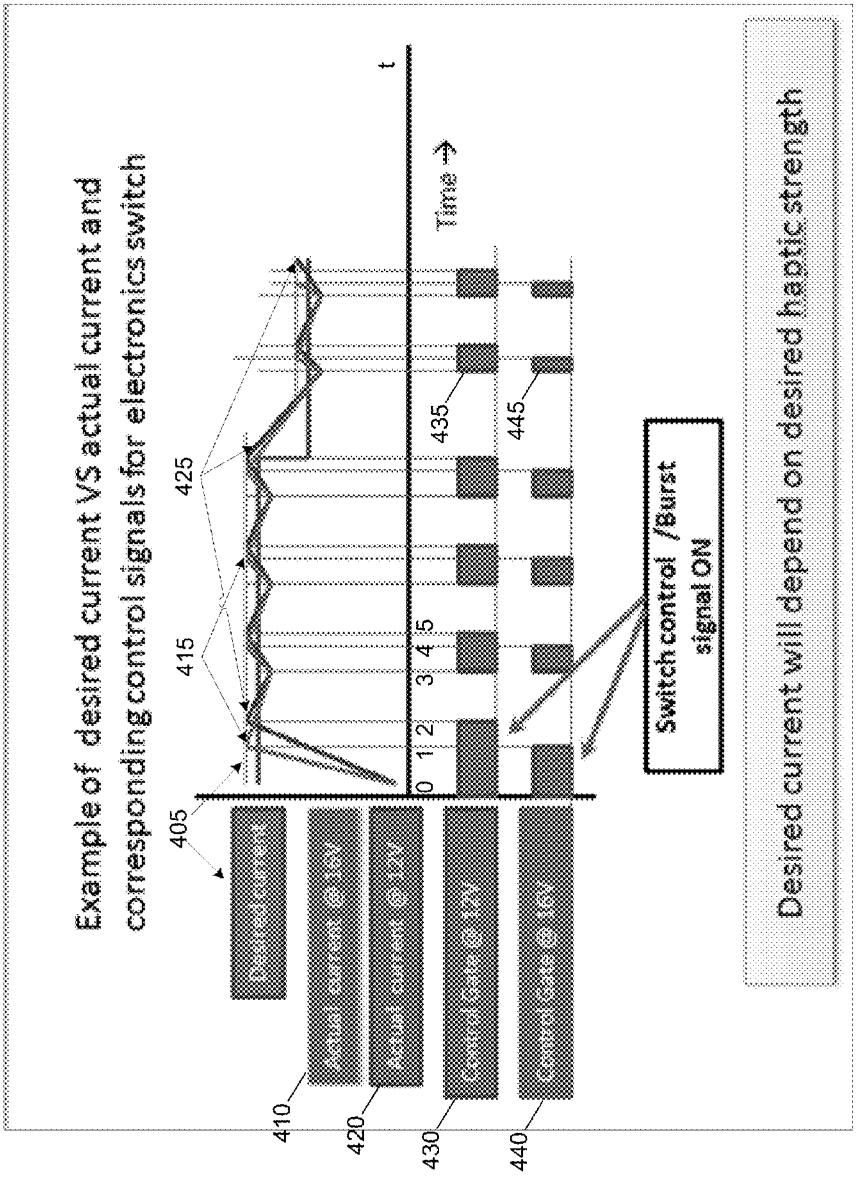
FIG. 4 is a graph illustrating actual current through an actuator versus desired current through an actuator at different input voltages in accordance with one embodiment.

FIG. 4 is a graph illustrating actual current through actuator 210 versus desired current through actuator 210 at different input voltages in accordance with one embodiment. The graph in FIG. 4 also illustrates the operation of gate 215 at different input voltages in accordance with one embodiment. The graph compares the current response of actuator 210 operating at two different input voltages with the same desired current. A desired current 405 is shown plotted over a time period, t. An actual current at 16 volts 410 is shown plotted over the same time period, resulting in a waveform 415. An actual current at 12 volts 420 is shown plotted over the same time period, resulting in a waveform 425. Waveforms 415 and 425 are superimposed over the desired current 405 over the same time period to illustrate the variation between the actual current, 415 and 425, and the desired current 405 for the supply voltage of 16 volts and 12 volts. The operation of control gate 215 operating at 12 volts 430 is shown by a horizontal bar, e.g., 435. The operation of control gate 215 operating at 16 volts 440 is shown by a horizontal bar, e.g., 445. For each of horizontal bars 430 and 440, the presence of the bar indicates that switch 220 is closed and power is flowing to actuator 210.

At time event 0, power is supplied to actuator 210, showing a ramp up in actual current at both voltage input levels. At time event 1, the actual current 415 provided by the 16 volt source has overshot the desired current 405. Control gate bar 440 indicates that the power is interrupted to actuator 210 by gate 215 causing switch 220 to open. At time event 2, the actual current 425 provided by the 12 volt source has overshot the desired current. Control gate bar 430 indicates that power is interrupted to actuator 210 by gate 215 controlling switch 220 to open. A capacitor in the circuit (not shown) has been charged by the supply voltages and continues to supply current to actuator 210 from time event 1 to time event 3 for the 16 volt supply and from time event 2 to time event 3 for the 12 volt supply. At time event 3, gate 215 has sensed that the actual current 415 and 425 for both supply voltages has dropped below the desired current 405 and causes switch 220 to again provide power from the voltage sources to actuator 210. At time event 4, the actual current 415 from the 16 volt supply has again overshot the desired current 405 and gate 215 interrupts power from the 16 volt source by switch 220. At time event 5, the actual current 425 from the 12 volt supply has again overshot the desired current 405 and gate 415 interrupts power from the 12 volt source by switch 220.

The cycle of opening and closing switch 220 results in an actual provided current that oscillates above and below the desired current level and approximates the desired current level 405. Further, the differences in actual current between the two input voltages are illustrated to be minimal. Thus, a haptic actuator powered by circuit 16 will provide a nearly uniform haptic response over varying voltage inputs. One skilled in the art will realize that although time event 3, for example, illustrates closing switch 220 for both input voltage sources at the same time, the actual event may take place at different times depending on the sizes of the capacitors and timing implemented in the circuit.

Figure 5:
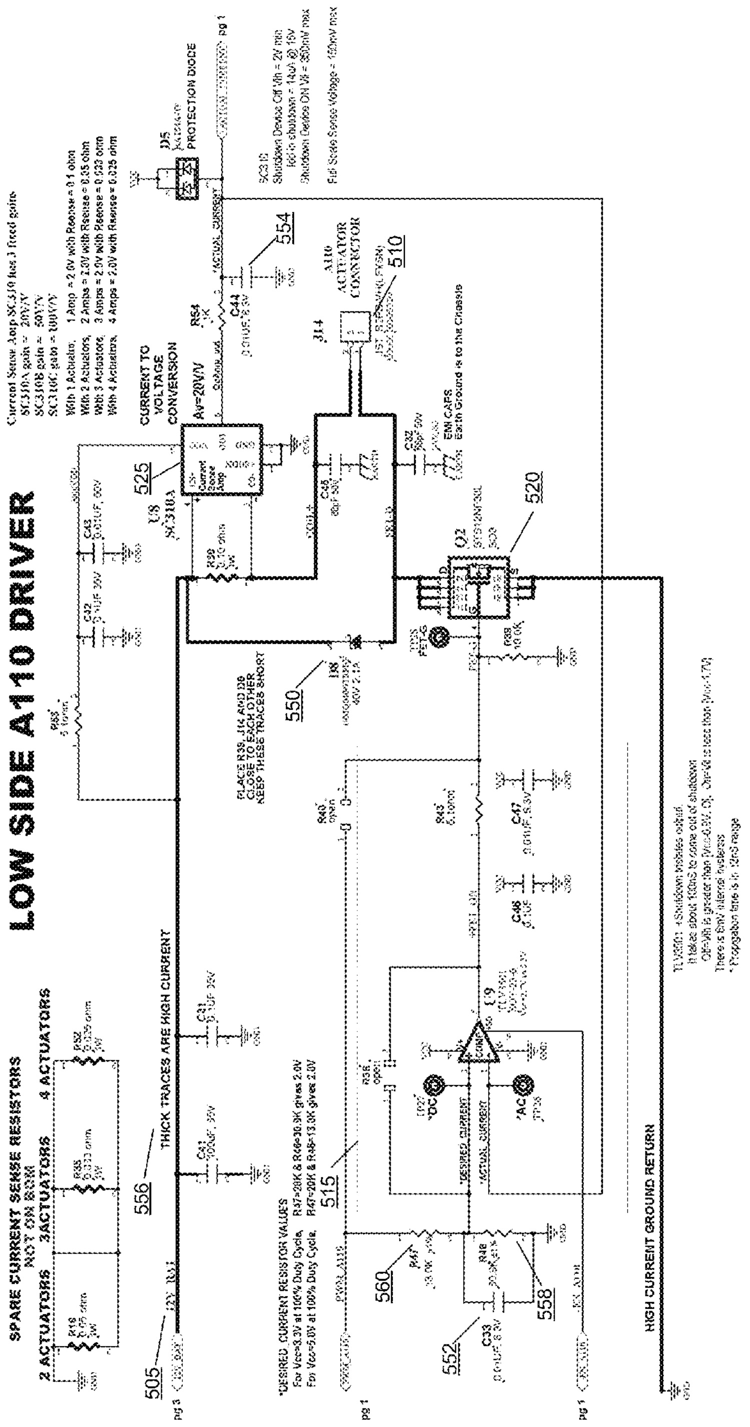
FIG. 5 is a circuit diagram of an actuator drive circuit in accordance with one embodiment.

FIG. 5 is a circuit diagram of actuator driver circuit 16 in accordance with one embodiment. Voltage source trace 505 corresponds to variable supply 205; actuator connector 510 corresponds to actuator 210; comparator component 515 corresponds to gate 215; MOSFET component 520 corresponds to switch 220; and current sense amp component 525 corresponds to probe 225. Support circuitry including capacitors and resistors are found throughout the diagram. One of ordinary skill in the art will understand that the values indicated in the diagram in FIG. 5 for resistors and capacitors may be changed to achieve similar results as the circuit depicted in FIG. 5 without undue experimentation. One will also understand that, although the diagram in FIG. 5 represents one way to interconnect the logic discussed above, other ways exist that are not specifically described herein, but would achieve a substantially similar effect.

The circuit in FIG. 5 includes, among other things zener diode "D8" (550) to backfeed the current through haptic actuator 510 to current sense amp 525. In addition, capacitors "C33" (552) and "C44" (554) as found in FIG. 5 may be changed from 0.01 μF to 0.1 μF, which would change the time constants from about 100 μs to 1 ms. For the component model part numbers found in the diagram of FIG. 5, one skilled in the art will understand that other suitable parts may be readily substituted for those listed, including without limitation other types of electronic switches or relays. Further, other integrated circuits may be substituted as appropriate to accomplish the same functions, but with programming. For example, the comparator found in FIG. 5 for gate 515 may be substituted with a microcontroller to provide the gating functions. The microcontroller may already be available on a haptic actuator driver circuitry associated with actuator driver circuit 16. Thus, some components may be physically eliminated. Also, as indicated in FIG. 5 (e.g., 556), the circuit may provide high current (e.g., 0.9 amps or more) to actuator 510.

In some embodiments, actuator driver circuit 16 may be integrated into a larger haptic circuit that provides a control signal in the form of the desired current level to circuit 16. Some embodiments may include a maximum current limiter to limit the desired current level to prevent damage to haptic actuator 210. Some embodiments may drive several haptic actuators through circuit 16 and may provide different maximum current limiter thresholds based on the number of actuators to be driven by the circuit. Some embodiments include a low pass filter on the actual current line input into gate 215 to create a delay time constant and to smooth response. In gate 215, a resistor may be added on a feedback line from the output of the comparator to the desired current input to the comparator with the effect of adding hysteresis to the comparator response to slow down the response of the current control on a change in desired input level, which may be needed if radio frequency ("RF") noise or interference is a problem. As mentioned above, in some embodiments the values of the capacitors may be changed to provide different time constants in the circuit.

In some embodiments, actuator control may originate at a haptic driver that provides a pulse width modulated ("PWM") control signal. In such embodiments, the PWM duty cycle is proportional to the desired actuator current so this duty cycle may be converted into a command DC voltage corresponding to the desired actuator current by low pass filters such as "R46" (558), "R47" (560), and "C33" (552) in FIG. 5. The voltage divider created by "R46" (558) and "R47" (560) creates the analog control signal corresponding to the desired current level. In such embodiments, a 100% duty cycle for the PWM signal would indicate a full strength haptic effect. The voltage divider may be scaled such that 100% duty cycle yields a 2 volt representative voltage condition for the desired current level. Since the desired current level corresponding voltage may be a function of the haptic driver power supply, these values may be rescaled if the haptic driver power supply changes.

Figure 6:
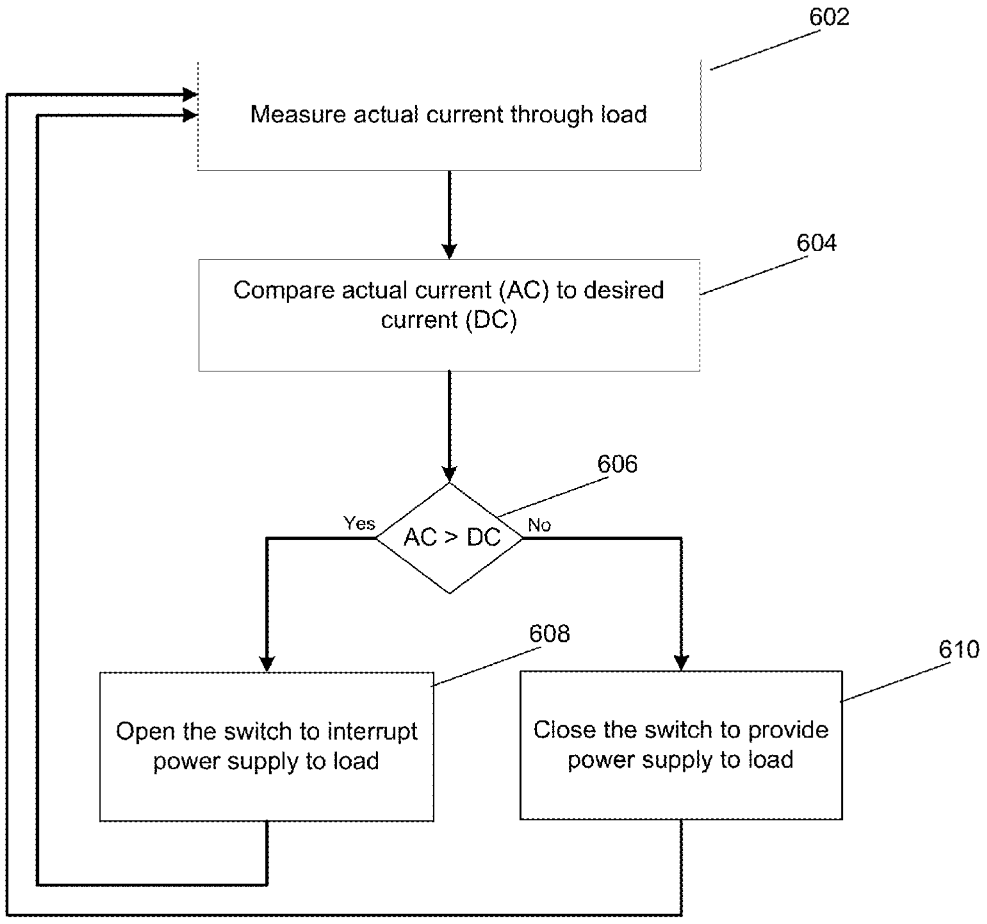
FIG. 6 is a flow diagram describing the logic implemented by an actuator drive circuit in accordance with one embodiment.

FIG. 6 is a flow diagram describing the logic implemented by actuator driver circuit 16 in accordance with one embodiment. Initial conditions for actuator 210 may be that no power is provided to actuator 210 and the desired current level for actuator 210 is zero. When processor 12 causes a haptic effect to occur on actuator 210, processor 12 determines a haptic signal to be sent to actuator driver circuit 16 including a desired current level greater than zero. As the desired current level rises, the desired current level at gate 215 begins to rise. The desired current level will pass through gate 215 to turn on switch 220, thereby providing power to actuator 210.

At 602, the actual current through actuator 210 is measured. At 604, gate 215 compares the actual current to the desired current level provided by processor 12. At 606, if the actual current is greater than the desired current, at 608 switch 120 is kept off, turned off, or opened to interrupt power through actuator 210. Power may continue to flow through actuator 210 due to circuit capacitors or internal induction present in actuator 210. Again, at 606, if the actual current is not greater than the desired current, at 610 switch 220 is kept on, turned on, or closed to provide power through actuator 210. The process returns to flow element 602 to repeat. Thus, the power is turned on or off according to a comparison between the actual current load and the desired current load. Notably, the value corresponding to the desired current may be changed at any time as well, and the circuit will compensate to provide an actual current approximating the desired current.

As disclosed, embodiments implement a haptic drive circuit which controls power provided to a load to produce a near uniform current response through the load over a varying voltage input. The load may be a haptic actuator. The drive circuit may use the desired current level to compare the desired current with an actual current through the load and control an electronic switch in provide power to the load if the actual current level through the load is less than or equal to the desired current level and interrupt power to the load if the actual current level through the load is greater than the desired current level.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A drive circuit for an actuator, the drive circuit comprising:

a voltage input and ground source input;

a desired current signal input;

a current probe coupled to the circuit between the voltage input and ground and configured to measure a current level for the actuator and output an actual current signal;

a gate coupled to the desired current signal and the actual current signal, the gate configured to compare the desired current signal to the actual current signal and output a switch signal based on the comparison; and a switch comprising a switch input coupled to the switch signal, a first leg coupled to the voltage input, and a second leg coupled to the ground source, wherein:

the gate is configured to cause the switch to interrupt power from the voltage input to the ground when the comparison indicates that the actual current signal is greater than the desired current signal, and the actual current signal comprises a haptic signal.

2. The drive circuit of claim 1, wherein the actual current signal continuously variably rises above or falls below the desired current signal.

3. The drive circuit of claim 2, wherein:

the voltage input receives a first voltage input resulting in a first current level measured by the current probe;

the voltage input receives a second voltage input resulting in a second current level measured by the current probe;

the first current level is substantially similar to the second current level; and the first voltage input and the second voltage input vary from one another.

4. The drive circuit of claim 2, wherein the actual current signal is a voltage representation of a first current level and the desired current signal is a voltage representation of a second current level.

5. The drive circuit of claim 4, wherein the actuator is one of a solenoid actuator, Eccentric Rotating Mass actuator, Linear Resonant Actuator, or a piezo transducer.

6. The drive circuit of claim 1, further comprising:

a low pass filter coupled between the current probe and gate to filter the actual current signal, wherein the filter creates a delay time constant.

7. The drive circuit of claim 6, further comprising:

a feedback from a control output of the gate to a desired current signal input of the gate; and a resistor coupled to the feedback, wherein the feedback adds hysteresis to the desired current level signal.

8. The drive circuit of claim 1, wherein the desired current signal is:

received into the circuit as a pulse width modulated control signal; and converted into a voltage measurement representing a desired current level.

9. A haptically-enabled system comprising:

an actuator;

a voltage source coupled to the actuator;

a ground source coupled to the actuator;

a switch located in series with the actuator to provide or interrupt power to the actuator;

a current probe coupled to the system to measure a first current flowing through the actuator and output a first current signature; and a gate comprising:

a first input coupled to the first current signature;

a second input coupled to a second current signature, the second current signature corresponding to a desired target current for the actuator; and an output coupled to a switching signal input of the switch, wherein:

the gate controls the switch, causing the switch to interrupt power when the first current signature is greater than the second current signature, and the first current comprises a haptic signal.

10. The system of claim 9, wherein the first current signature continuously variably rises above or falls below the second current signature.

11. The system of claim 10, wherein:

the voltage source provides a first voltage resulting in a first current level measured by the current probe;

the voltage source provides a second voltage resulting in a second current level measured by the current probe;

the first current level is substantially similar to the second current level; and the first voltage and second voltage vary from one another.

12. The system of claim 10, wherein the first current signature is a voltage representation of a first current level and the second current signature is a voltage representation of a second current level.

13. A method of providing current to an actuator, comprising:

receiving power from a voltage source to the actuator;

measuring an actual current level through the actuator;

comparing the actual current to a desired current level;

if the actual current level is greater than the desired current level, interrupting power provided by the voltage input until the actual current level is less than the desired current level; and repeating the method by providing power from the voltage input to the actuator again, wherein the actual current level comprises a haptic signal.

14. The method of claim 13, wherein the actual current level continuously variably rises above or falls below the desired current level.

15. The method of claim 14, further comprising:

receiving a first voltage from the voltage source;

measuring a first actual current level through the actuator;

receiving a second voltage from the voltage source; and measuring a second actual current level to the actuator, wherein the first actual current level is substantially similar to the second actual current level, and the first voltage and second voltage vary from one another.

16. The method of claim 14, wherein the actual current level is a voltage representation of a first current level and the desired current level is a voltage representation of a second current level.

17. The method of claim 16, wherein the actuator is one of a solenoid actuator, Eccentric Rotating Mass actuator, Linear Resonant Actuator, or a piezo transducer.

18. The method of claim 13, further comprising:

filtering the actual current level by a low pass filter, wherein the filtering creates a delay time constant.

19. The method of claim 18, further comprising:

providing feedback from a control output of the gate through a resistor to a desired current level input of the gate, wherein the feedback adds hysteresis to the desired current level input.

20. The method of claim 13, further comprising:

receiving a desired current level signal into the circuit as a pulse width modulated control signal; and converting the desired current level signal into a voltage measurement representing the desired current level.

* * * * *